US008229106B2

(12) United States Patent
Greiss et al.

(10) Patent No.: US 8,229,106 B2
(45) Date of Patent: Jul. 24, 2012

(54) APPARATUS AND METHODS FOR ENHANCEMENT OF SPEECH

(75) Inventors: Israel Greiss, Raanana (IL); Arie Gur, Kiriat Uno (IL)

(73) Assignee: D.S.P. Group, Ltd., Herzliya (IL)

( * ) Notice: Subject to any disclaimer, the term of this patent is extended or adjusted under 35 U.S.C. 154(b) by 1538 days.

(21) Appl. No.: 11/655,888

(22) Filed: Jan. 22, 2007

(65) Prior Publication Data

US 2008/0177532 A1    Jul. 24, 2008

(51) Int. Cl.
*H04M 1/00* (2006.01)
*H04M 9/00* (2006.01)

(52) U.S. Cl. ........................................................ 379/395

(58) Field of Classification Search .................... 379/395
See application file for complete search history.

(56) References Cited

U.S. PATENT DOCUMENTS

| | | | | |
|---|---|---|---|---|
| 5,737,719 | A | 4/1998 | Terry | |
| 5,818,929 | A * | 10/1998 | Yaguchi | 379/418 |
| 5,832,437 | A * | 11/1998 | Nishiguchi et al. | 704/268 |
| 6,781,470 | B2 * | 8/2004 | Rogerson | 331/57 |
| 7,042,986 | B1 | 5/2006 | Lashley et al. | |
| 2004/0138876 | A1 | 7/2004 | Kallio et al. | |
| 2004/0264599 | A1 * | 12/2004 | Lliev | 375/298 |
| 2007/0217627 | A1 * | 9/2007 | Ghanekar et al. | 381/104 |
| 2008/0069385 | A1 * | 3/2008 | Revit | 381/321 |
| 2008/0177532 | A1 * | 7/2008 | Greiss et al. | 704/200.1 |

FOREIGN PATENT DOCUMENTS

WO 02/052545 A1 7/2002

OTHER PUBLICATIONS

Cheung-Fat Chan and Wai-Kwong Hui, Quality Enhancement of Narrowband CELP-Coded Speech Via Wideband Harmonic Re-Synthesis,1997 IEEE pp. 1187-1190.*

Kallio, Laura, "Artificial Bandwidth Expansion of Narrowband Speech in Mobile Communication Systems", Internet Citation Online, Dec. 9, 2002, pp. 1-62, XP002451371.

(Continued)

*Primary Examiner* — Alexander Jamal
(74) *Attorney, Agent, or Firm* — Browdy and Neimark, PLLC

(57) ABSTRACT

A method for improving the intelligibility of an incoming telephone signal, including boosting loudness of at least one band of poorly heard frequencies of the signal within at least one band of intensities of the signal, the band lying below a predetermined intensity level at which telephone standard conformance testing is performed, thereby to generate a differentially boosted telephone signal. Alternatively or in addition, intelligibility of sibilants in a narrow band telephone signal is enhanced, by doubling the sampling rate of the narrow band signal by interpolation, thereby to provide a narrow band interpolated signal, generating a harmonic extrapolation signal by harmonically extrapolating from the narrow band interpolated signal thereby to estimate the missing portions of the telephone signal, the harmonic extrapolation comprising a sequence of pulses located at peaks of the interpolated signal, generating a missing energy estimator measure estimating energy missing at high frequency bands of the telephone signal, continuously modulating the amplitude of the pulses in said sequence of pulses based on said missing energy estimator measure, thereby to generate a modulated signal, passing the modulated signal through a shaping filter thereby to obtain a shaped signal, and summing the shaped signal with the interpolated signal.

26 Claims, 9 Drawing Sheets

OTHER PUBLICATIONS

Chennoukh et al., "Speech enhancement via frequency bandwidth extension using line spectral frequencies", IEEE International Conference on Acoustics, Speech, and Signal Processing 2001 (ICASSP'01). vol. 1, pp. 7-11, May 2001.
Chen et al., "HMM-based frequency bandwidth extension for speech enhancement using line spectral frequencies", IEEE Acoustics, Speech, and Signal Processing, 2004. Proceedings. (ICASSP '04).
Soon et al., "Bandwidth extension of narrowband speech using cepstral analysis", Proceedings of Intelligent Multimedia, Video and Speech Processing, 2004. pp. 242-245, Oct. 20-22, 2004.
Jax et al., "Feature selection for improved bandwidth extension of speech signals", IEEE International Conference on Acoustics, Speech, and Signal Processing, 2004. (ICASSP '04). vol. 1, pp. 697-700, May 17-21, 2004.
Jax et al., "Artificial bandwidth extension of speech signals using MMSE estimation based on a hidden Markov model", IEEE International Conference on Acoustics, Speech, and Signal Processing, 2003. (ICASSP '03). vol. 1, pp. 680-683, Apr. 6-10, 2003.
Soon et al., "Transformation of narrowband speech into wideband speech with aid of zero crossings rate", Electronics Letters, vol. 38, Issue 24, pp. 1607-1608, Nov. 21, 2002.
Park et al., "Narrowband to wideband conversion of speech using GMM based transformation", IEEE International Conference on Acoustics, Speech, and Signal Processing, 2000. (ICASSP '00). vol. 3, pp. 1843-1846, Jun. 5-9, 2000.
Nilsson et al., "Avoiding over-estimation in bandwidth extension of telephony speech", IEEE International Conference on Acoustics, Speech, and Signal Processing, 2001. (ICASSP '01). vol. 2, pp. 869-872, May 7-11, 2001.
Epps et al., "A new technique for wideband enhancement of coded narrowband speech", IEEE Workshop on Speech Coding Proceedings, 1999, (WSCP'99), pp. 174-176, Jun. 20-23, 1999.
H. Yasukawa, "Wideband speech recovery from bandlimited speech in telephone communications", IEEE International Symposium on Circuits and Systems, 1998. (ISCAS '98), vol. 4, pp. 202-205, May 31-Jun. 3, 1998.

* cited by examiner

| Curve Legend | Input level (DB) |
|---|---|
| A | 0 |
| B | -10 |
| C | -20 |
| D | -30 |
| E | -40 |
| F | -50 |
| G | -60 |
| H | -70 |

APPARATUS AND METHODS FOR ENHANCEMENT OF SPEECH

FIELD OF THE INVENTION

The present invention relates generally to speech enhancement.

BACKGROUND OF THE INVENTION

The state-of-the-art is believed to be represented by the following publications:

1. "Speech enhancement via frequency bandwidth extension using line spectral frequencies", Chennoukh, S.; Gerrits, A.; Miet, G.; Sluijter, R.; IEEE International Conference on Acoustics, Speech, and Signal Processing, 2001. Proceedings.(ICASSP'01).2001 sVolume 1, 7-11 May 2001

The abstract of the above publication states that it "contributes to narrowband speech enhancement by means of frequency bandwidth extension. A new algorithm is proposed for generating synthetic frequency components in the high-band (i.e., 4-8 kHz) given the low-band ones (i.e., 0-4 kHz) for wide-band speech synthesis. It is based on linear prediction (LPC) analysis-synthesis. It consists of a spectral envelope extension using efficiently line spectral frequencies (LSF) and a bandwidth extension of the LPC analysis residual using a spectral folding. The low-band LSF of the synthesis signal are obtained from the input speech signal and the high-band LSF are estimated from the low-band ones using statistical models. This estimation is achieved by means of four models that are distinguished by means of the first two reflection coefficients obtained from the input signal linear prediction analysis."

2. "HMM-based frequency bandwidth extension for speech enhancement using line spectral frequencies", Chen, G.; Parsa, V.; IEEE Acoustics, Speech, and Signal Processing, 2004. Proceedings. (ICASSP '04).

The abstract of the above publication states: "A new hidden Markov model (HMM) based frequency bandwidth extension algorithm using line spectral frequencies (HMM-LSF-FBE) is proposed. The proposed algorithm improves the performance of the traditional LSF-based extension algorithm by exploiting an HMM to indicate the proper representatives of different speech frames, and by applying a minimum mean square-criterion to estimate the high-band LSF values. The proposed algorithm has been tested and compared to the traditional LSF-based algorithm in terms of the perceptual evaluation of speech quality (PESQ) objective measure and speech spectrograms. Simulation results show that the proposed algorithm outperforms the traditional method by eliminating undesired whistling sounds completely. In addition, the bandwidth extended speech signals created by the proposed algorithm are significantly more pleasant to the human ear than the original narrowband speech signals from which they are derived."

3. "Bandwidth extension of narrowband speech using cepstral analysis" Soon, I. Y.; Yeo, C. K.; Proceedings of Intelligent Multimedia, Video and Speech Processing, 2004. 20-22 Oct. 2004 Page(s): 242-245.

The abstract of the above publication states: "This paper describes a vector quantization based algorithm that extends the bandwidth of narrowband speech into wideband speech. Cepstral analysis is used to represent the spectral envelope information and the wideband excitation is generated using fallwave rectification with spectral whitening. Objective and subjective tests conducted show great improvement in speech quality over the original narrowband speech. The algorithm can be implemented as a postprocessor without the need for any side information."

4. Feature selection for improved bandwidth extension of speech signals Jax, P.; Vary, P.; IEEE International Conference on Acoustics, Speech, and Signal Processing, 2004. (ICASSP '04). Volume 1, 17-21 May 2004 Page(s): I-697-700 vol. 1.

The abstract of the above publication states: "The aim of artificial bandwidth extension (BWE) is to convert speech signals with "standard telephone" quality (frequencies up to 3.4 kHz) into 7 kHz wideband speech. The principal key to high quality BWE is the estimation of the spectral envelope of the wideband speech. In general, this estimation of the wideband spectral envelope is based on a number of features that are extracted from the narrowband input speech signal. We investigate potential features and evaluate their suitability for the BWE application. The quality of each feature is quantified in terms of the statistical measures of mutual information and separability. It turns out that the best BWE results are obtained by using a large feature "super-vector" which is subsequently reduced in dimension by a linear discriminant analysis. This solution also helps to reduce the computational complexity of the estimation of the wideband spectral envelope."

5. Artificial bandwidth extension of speech signals using MMSE estimation based on a hidden Markov model, Jax, P.; Vary, P.; IEEE International Conference on Acoustics, Speech, and Signal Processing, 2003. (ICASSP '03). 2003 Volume 1, 6-10 Apr. 2003 Page(s):I-680-I-683 vol. 1.

The abstract of the above publication states: "We present an algorithm to derive 7 kHz wideband speech from narrowband "telephone speech". A statistical approach is used that is based on a hidden Markov model (HMM) of the speech production process. A new method for the estimation of the wideband spectral envelope is proposed, using nonlinear state-specific techniques to minimize a mean square error criterion. In contrast to common memoryless estimation methods, additional information from adjacent signal frames can be exploited by utilizing the HMM. A consistent advantage of the new estimation rule is obtained compared to previously published HMM-based hard or soft Classification."

6. *"Transformation of narrowband speech into wideband speech with aid of zero crossings rate"*, Soon, I. Y.; Koh, S. N.; Yeo, C. K.; Ngo, W. H.; Electronics Letters, Volume 38, Issue 24, 21 Nov. 2002 Page(s): 1607-1608.

The abstract of the above publication states: "An innovative technique, for narrowband to wideband transformation of speech signals, is proposed. The zero crossings rate is used to adaptively control the gain of the synthesised upper band speech leading to significant performance improvement over an existing technique. Results are in fact comparable to more complex techniques. The technique can be implemented at the receiving end alone as it does not require any side information to be transmitted and can be easily implemented using finite impulse response digital filters."

7. *Narrowband to wideband conversion of speech using GMM based Transformation*, Kun-Youl Park; Hyung Soon Kim; IEEE International Conference on Acoustics, Speech, and Signal Processing, 2000. ICASSP '00. Volume 3, 5-9 Jun. 2000, Page(s): 1843-1846.

The abstract of the above publication states: "Reconstruction of wideband speech from its narrowband version is an attractive issue, since it can enhance the speech quality without modifying the existing communication networks. This paper proposes a new recovery method of wideband speech from narrowband speech. In the proposed method, the narrowband spectral envelope of input speech is transformed to a wideband spectral envelope based on the Gaussian mixture model (GMM), whose parameters are calculated by a joint density estimation technique. Then the lowband and high-band speech signal is reconstructed by the LPC synthesizer using the reconstructed spectral envelope. This paper also proposes a codeword-dependent power estimation method. Both the objective and subjective test results shows that the proposed algorithm outperforms the conventional codebook mapping method."

8. *Avoiding over-estimation in bandwidth extension of telephony speech* Nilsson, M.; Kleijn, W. B.; IEEE International Conference on Acoustics, Speech, and Signal Processing, 2001. (ICASSP '01). Volume 2, 7-11 May 2001 Page(s): 869-872.

The abstract of the above publication states: "We present a new way of treating the problem of extending a narrow-band signal to a wide-band signal. For many cases of bandwidth extension, the high-band energy is overestimated, leading to undesirable audible artifacts. To overcome these problems we introduce an asymmetric cost-function in the estimation process of the high-band that penalizes over-estimates more than under-estimates of the energy in the high-band. We show that the resulting attenuation of the estimated high-band energy depends on the broadness of the a-posteriori distribution of the energy given the extracted information about the narrow-band. Thus, the uncertainty about how to extend the signal at the high-band influences the level of extension. Results from a listening test show that the proposed algorithm produces less artifacts."

9. *A new technique for wideband enhancement of coded narrowband speech*, Epps, J.; Holmes, W. H.; IEEE Workshop on Speech Coding Proceedings. 20-23 Jun. 1999, Page(s): 174-176.

The abstract of the above publication states: "Telephone speech is typically bandlimited to 4 kHz, resulting in a 'muffled' quality. Coding speech with a bandwidth greater than 4 kHz reduces this distortion, but requires a higher bit rate to avoid other types of distortion. An alternative to coding wider bandwidth speech is to exploit correlations between the 0-4 kHz and 4-8 kHz speech bands to re-synthesize wideband speech from decoded narrowband speech. This paper proposes a new technique for highband spectral envelope prediction, based upon codebook mapping with codebooks split by voicing. An objective comparison with several existing methods reveals that this new technique produces the smallest highband spectral distortion. Combined with a suitable high-band excitation synthesis scheme, this envelope prediction scheme produces a significant quality improvement in speech that has been coded using narrowband standards."

10. *Wideband speech recovery from bandlimited speech in telephone communications*, Yasukawa, H.; IEEE International Symposium on Circuits and Systems, 1998. ISCAS '98. Volume 4, 31 May-3 Jun. 1998 Page(s) 202-205, vol. 4.

The abstract of the above publication states: "This paper describes methods that can enhance the quality of speech signals that are severely band limited during regular telephone speech transmission. We have already proposed a spectrum widening method that utilizes aliasing in sampling rate conversion and digital filtering for spectrum shaping. This paper discusses the method using linear prediction. Speech components of the outbands of the received signal are basically generated by LPC (linear predictive coding) synthesis by analysis. Furthermore, we discuss a new spectrum widening method using a multilayer backpropagation neural network. It is shown that the proposed method has a good performance of recovering the wideband speech."

The disclosures of all publications and patent documents mentioned in the specification, and of the publications and patent documents cited therein directly or indirectly, are hereby incorporated by reference.

SUMMARY OF THE INVENTION

The present invention seeks to provide apparatus and methods for dynamic speech enhancement.

The human hearing curve is most sensitive (has the lowest hearing threshold) at medium frequencies. Sensitivity decreases as the frequency decreases, sometimes necessitating intensification or boosting of the loudness or intensity of low frequencies and/or of high frequencies to achieve a signal which exceeds the hearing threshold. In contrast, for high intensities, there is no need for special treatment of particularly low or high frequencies.

According to a preferred embodiment of the present invention, a telephone instrument with dynamic loudness functionality is provided which is operative to improve the dynamic range of hearing by measuring hearing intensity or loudness, performing compression, and expansion to the dynamic range using a suitable preferably programmable nonlinear curve which enhances or boosts low and high frequencies, preferably to a designer-selected extent, typically only when intensities are medium low. For intensities below the hearing threshold, and for normal intensities at which the instrument's responsivity is tested, little or no boosting is performed so as not to impair conformance testing results.

The threshold intensity level is preferably programmable so as to allow a telephone designer to accommodate for, inter alia, country-specific standards and specifics of acoustics which, for example, typically differs significantly between Hand-Free speaker telephones and ear phones.

Additionally or in addition, wide band synthesis is provided in accordance with certain embodiments of the invention. Conventional telephone networks limit the bandwidth to a range of approximately 3000-3400 Hz. Sibilants, which have much energy above this range, are hard to hear and it is difficult to distinguish between them. Known methods for reconstructing the high frequency ranges, e.g. up to 7 KHz, based on the narrow band signal which is received, are complicated, add delay and add artifacts which are perceived as unnatural.

According to a preferred embodiment of the present invention, a harmonic extrapolation signal is generated by using extremum points of pulses from a narrow-band signal which has been double sampled to prevent mirror frequency distortion. Continuous modulation of this signal is then employed, in conjunction with use of an estimator of energy in the expanded frequency range. A band pass filter selects the frequency for the harmonic extrapolation process. Finally, the result of this process is added to the double sample rate narrow band signal.

There is thus provided, in accordance with a preferred embodiment of the present invention, apparatus for improving the intelligibility of an incoming telephone signal, the apparatus comprising a frequency band and intensity dependent loudness modifier operative to boost loudness of at least one band of poorly heard frequencies of the incoming telephone signal within at least one band of intensities of the incoming telephone signal, the band lying below a predetermined intensity level at which telephone standard conformance testing is performed, thereby to generate a loudness boosted signal, wherein the loudness modifier is also operative to boost loudness of at least one band of poorly heard frequencies of the incoming telephone signal at the predetermined intensity level wherein the loudness is boosted at the predetermined intensity level only to the extent allowed by the telephone standard.

Also provided, in accordance with a preferred embodiment of the present invention, is a method for improving the intelligibility of an incoming telephone signal, the method comprising boosting loudness of at least one band of poorly heard frequencies of the incoming telephone signal within at least one band of intensities of the incoming telephone signal, the band lying below a predetermined intensity level at which telephone standard conformance testing is performed, thereby to generate a dynamically boosted telephone signal.

Further in accordance with a preferred embodiment of the present invention, the loudness is boosted within the intensity band to an extent which exceeds the extent allowed by the telephone standard at the predetermined intensity level.

Still further in accordance with a preferred embodiment of the present invention, the apparatus resides interiorly of a telephone receiver.

Further in accordance with a preferred embodiment of the present invention, the band of poorly heard frequencies in which loudness is boosted within the at least one band of intensities is programmable.

Still further in accordance with a preferred embodiment of the present invention, the band of intensities at which the loudness of a band of poorly heard frequencies is boosted, is programmable.

Additionally in accordance with a preferred embodiment of the present invention, the loudness modifier is operative to attenuate loudness of at least one band of frequencies of the incoming telephone signal within at least one band of intensities of the incoming telephone signal lying below a threshold intensity level, below which the signal is considered background noise.

Also provided, in accordance with a preferred embodiment of the present invention, is an apparatus for enhancing the intelligibility of sibilants in a narrow band telephone signal, the apparatus comprising a sample rate doubler, doubling the sampling rate of the narrow band telephone signal by interpolation, thereby to provide an interpolated signal, a harmonic extrapolator producing a harmonic extrapolation of missing portions of the telephone signal, the harmonic extrapolation comprising a sequence of pulses located at peaks of the interpolated signal, a missing energy estimator generating a missing energy estimator measure estimating energy missing at high frequency bands of the telephone signal, a continuous amplitude modulator continuously modulating the amplitude of the pulses in the sequence of pulses based on the missing energy estimator measure, thereby to generate a modulated signal, a shaping filter which converts the modulated signal into a shaped signal, and a ‘summer’, summing the shaped signal with the interpolated signal.

Further in accordance with a preferred embodiment of the present invention, operation of the loudness modifier is determined at least partly as a function of a loudness estimate determined by filtering the incoming telephone signal, measuring the energy of the filtered signal, and smoothing the measured energy over time.

Still further in accordance with a preferred embodiment of the present invention, the extent of boosting is a non-linear function of the intensity level of the incoming telephone signal.

Further in accordance with a preferred embodiment of the present invention, the apparatus also comprises a compression table storing desired levels of boosting as a function of intensity level of the incoming telephone signal.

Still further in accordance with a preferred embodiment of the present invention, operation of the loudness modifier is determined at least partly as a function of a loudness estimate determined recursively by measuring the energy of the telephone signal after its loudness has been modified by the loudness modifier.

Further in accordance with a preferred embodiment of the present invention, at least one of the extent of loudness modification and the direction of loudness modification effected by the loudness modifier at at least one intensity level is determined as a function of the loudness estimate.

Still further in accordance with a preferred embodiment of the present invention, the apparatus also comprises a low pass filter receiving and filtering the incoming telephone signal thereby to provide a low passed signal and a virtual bass reconstructor operative to compute an envelope estimate by band-pass filtering an absolute value of the low passed signal and passing the band-passed filtered absolute value into a summation operator for summation with the loudness boosted signal.

Further in accordance with a preferred embodiment of the present invention, the apparatus also comprises a programmable multiplier operative to multiply the envelope estimate by a programmed factor.

Also provided, in accordance with a preferred embodiment of the present invention, is a method for enhancing the intelligibility of sibilants in a narrow band telephone signal, the method comprising doubling the sampling rate of the narrow band telephone signal by interpolation, thereby to provide a narrow band interpolated signal, generating a harmonic extrapolation signal by harmonically extrapolating from the narrow band interpolated signal thereby to estimate the missing portions of the telephone signal, the harmonic extrapolation comprising a sequence of pulses located at peaks of the interpolated signal, generating a missing energy estimator measure estimating energy missing at high frequency bands of the telephone signal, continuously modulating the amplitude of the pulses in the sequence of pulses based on the missing energy estimator measure, thereby to generate a modulated signal, passing the modulated signal through a shaping filter thereby to obtain a shaped signal; and summing the shaped signal with the interpolated signal.

Further in accordance with a preferred embodiment of the present invention, the step of generating a missing energy estimator measure comprises passing the narrow band telephone signal through a zero-crossing identification unit and subsequently through a low pass filter thereby to generate an LPF output; and multiplying the LPF output by an estimate of the energy of the high frequency portion of the narrow band telephone signal thereby to obtain the energy estimator measure, and wherein the step of continuously modulating comprises multiplying an amplitude function of the sequence of pulses by the energy estimator measure.

Further in accordance with a preferred embodiment of the present invention, the estimate of the energy of the high frequency portion is generated by passing the narrow band telephone signal through a high pass filter comprising a differentiator, thereby to generate a high pass filtered signal, and subtracting from the high pass filtered signal an estimate of the noise level of the filtered narrow band telephone signal.

Additionally in accordance with a preferred embodiment of the present invention, the shaping filter comprises a band-pass filter.

Further in accordance with a preferred embodiment of the present invention, the peaks comprise positive peaks.

Still further in accordance with a preferred embodiment of the present invention, the peaks comprise negative peaks.

Additionally in accordance with a preferred embodiment of the present invention, the peaks comprise all positive peaks and all negative peaks.

Further in accordance with a preferred embodiment of the present invention, the shaping filter comprises a band pass filter.

Still further in accordance with a preferred embodiment of the present invention, random noise is added to the harmonic extrapolation signal.

Additionally in accordance with a preferred embodiment of the present invention, the step of generating a missing energy estimator measure comprises passing a pulse train signal located at peaks of the interpolated signal via a low pass filter; and multiplying the filtered pulse train signal by an estimate of the energy of a high frequency portion of the narrow band telephone signal thereby to obtain the energy estimator measure.

Additionally in accordance with a preferred embodiment of the present invention, the method also comprises doubling the sampling rate of the differentially boosted telephone signal by interpolation, thereby to provide an interpolated signal, producing a harmonic extrapolation of missing portions of the differentially boosted telephone signal, the harmonic extrapolation comprising a sequence of pulses located at peaks of the interpolated signal, generating a missing energy estimator measure estimating energy missing at high frequency bands of the differentially boosted telephone signal, continuously modulating the amplitude of the pulses in the sequence of pulses based on the missing energy estimator measure, thereby to generate a modulated signal, passing the modulated signal through a shaping filter thereby to obtain a shaped signal, and summing the shaped signal with the interpolated signal.

Particular advantages of preferred embodiments of the present invention include one, some or all of the following:

a. Upgrading of telephone voice quality b. Restoration of the natural sound, color and brightness of a voice from a narrow band representation of the voice c. Improvement of intelligibility including the ability to distinguish sibilants lost in the telephone network d. Expansion of bandwidth of signal from narrow to wide e.g. from 3.4 KHz to 6.5 KHz e. Signal may be adapted to accommodate the human hearing thresholds f. Virtual bass provided to reproduce a virtual replacement of low frequency energy removed by network and/or loudspeaker.

The following acronyms and abbreviations are used herein:

AEC: Acoustic echo cancellation
AGC: Any method of automatically controlling the gain of an audio path
Atten: attenuation
BPF: band pass filter
Deci: Decimator
DF: data flow connection point
DLN: dynamic loudness
DRAM: dynamic random access memory
DROM: dynamic read only memory
DSE: dynamic speech enhancement
EC: echo canceller
FFT: fast Fourier transform
FW: firmware
Gb: Gain of bass
Gt: gain factor
HPF: high pass filter
HS: handset module
HW: hardware
Inter: interpolator
kHz: kilo Hertz
LPF: low pass filter
LPC: linear predictive coding algorithm.
MIPS: millions of instructions per second
Matlab: The Mathworks Inc. programming language.
PROM: programmable read only memory
rn: random noise
Rx: receiver
SD: Sigma Delta Codec
TBR38: European telephony testing standard
Tx: transmitter

BRIEF DESCRIPTION OF THE DRAWINGS

Preferred embodiments of the present invention are illustrated in the following drawings.

DETAILED DESCRIPTION OF PREFERRED EMBODIMENTS

Figure 1:
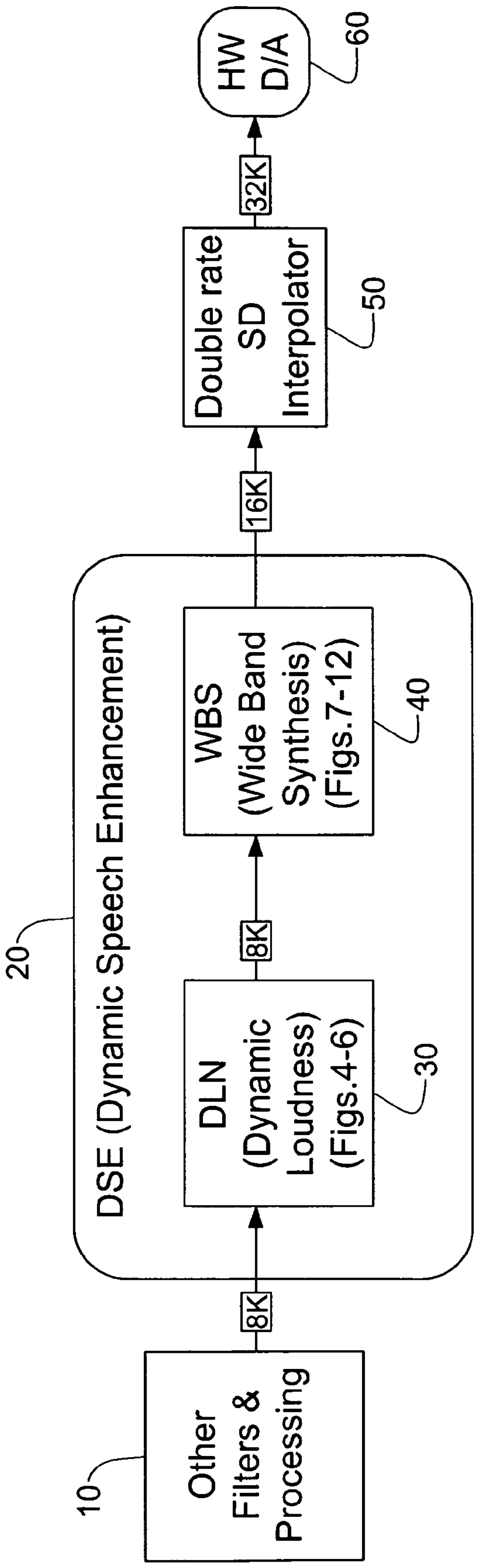
FIG. 1 is a simplified block diagram of DSE circuitry constructed and operative in accordance with a preferred embodiment of the present invention in a simple DF connection.

Reference is now made to FIG. 1 which illustrates dynamic speech enhancement (DSE) apparatus in a simple DF connection, constructed and operative in accordance with a preferred embodiment of the present invention. As shown, the apparatus includes filters and processing units 10, and a DSE module 20 including a dynamic loudness (DLN) unit 30 and/or a WBS (wide band synthesis) unit 40, each of which may also be provided separately. The DSE module 20 may feed into output HW D/A unit 60 via an SD interpolator 50. It is appreciated that the data flow order particularly shown in FIG. 1 is shown merely by way of example and is not intended to be limiting. The dynamic loudness unit 30 may run as a simple DF module at 8 KHz. Typically, the following FW modifications are made to accommodate the wide band synthesis unit 40: (a) provision of a 16 KHz output node; (b) increase of the SD clock to 32 KHz; and doubling of the rate at the SD interpolator 50 e.g. from 16 KHz to 32 KHz.

The dynamic loudness module 30 is operative to improve intelligibility e.g. by fixing or modifying the incoming signal to fit a human hearing threshold. A virtual bass unit is preferably provided to replace low frequency energy removed by the network and/or loudspeaker as described hereinbelow.

The wide band synthesis module 40 is operative to expand the bandwidth from narrow to wide e.g. from 3.4 KHz to 6.5 KHz. A particular advantage of a preferred embodiment of this module is that it enhances distinction between sibilants.

Figure 2:
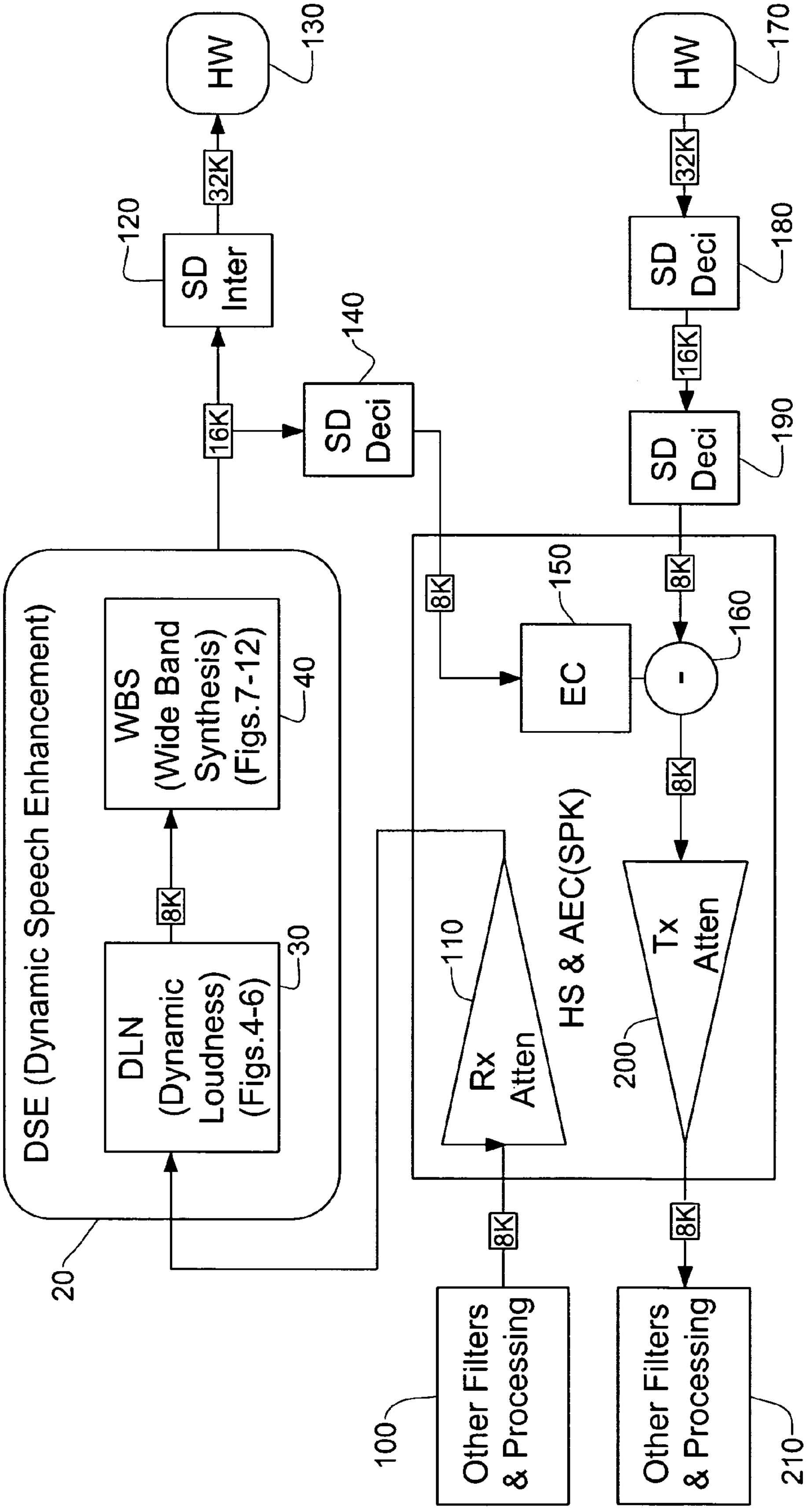
FIG. 2 is a simplified block diagram of DSE circuitry constructed and operative in accordance with a preferred embodiment of the present invention in a hands-free DF connection.

FIG. 2 is a simplified block diagram of integration of dynamic speech enhancement (DSE) unit 20 circuitry constructed and operative in accordance with a preferred embodiment of the present invention into a standard digital handsfree telephone handset apparatus. The diagram describes the data flow using DF connection points.

Figure 3:
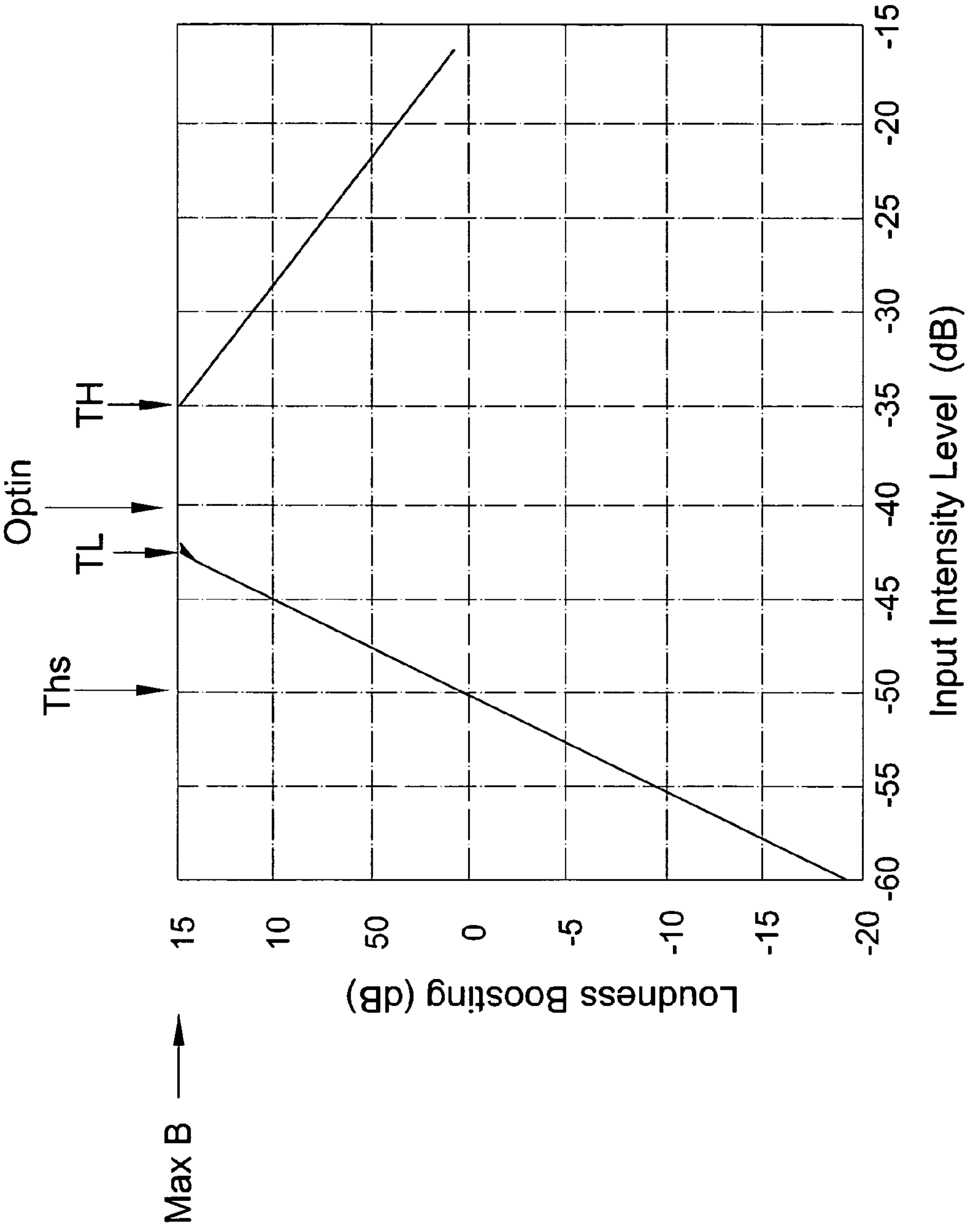
FIG. 3 is a graph of a typical compression function for the Dynamic loudness module of FIGS. 1-2 in which, typically, very low input loudnesses are attenuated (reduced), medium-low input loudnesses are boosted (increased), and medium-high input loudnesses remain unmodified or are hardly modified so as not to impair TBR38 or other conformance testing results.
Figures 4, 5:
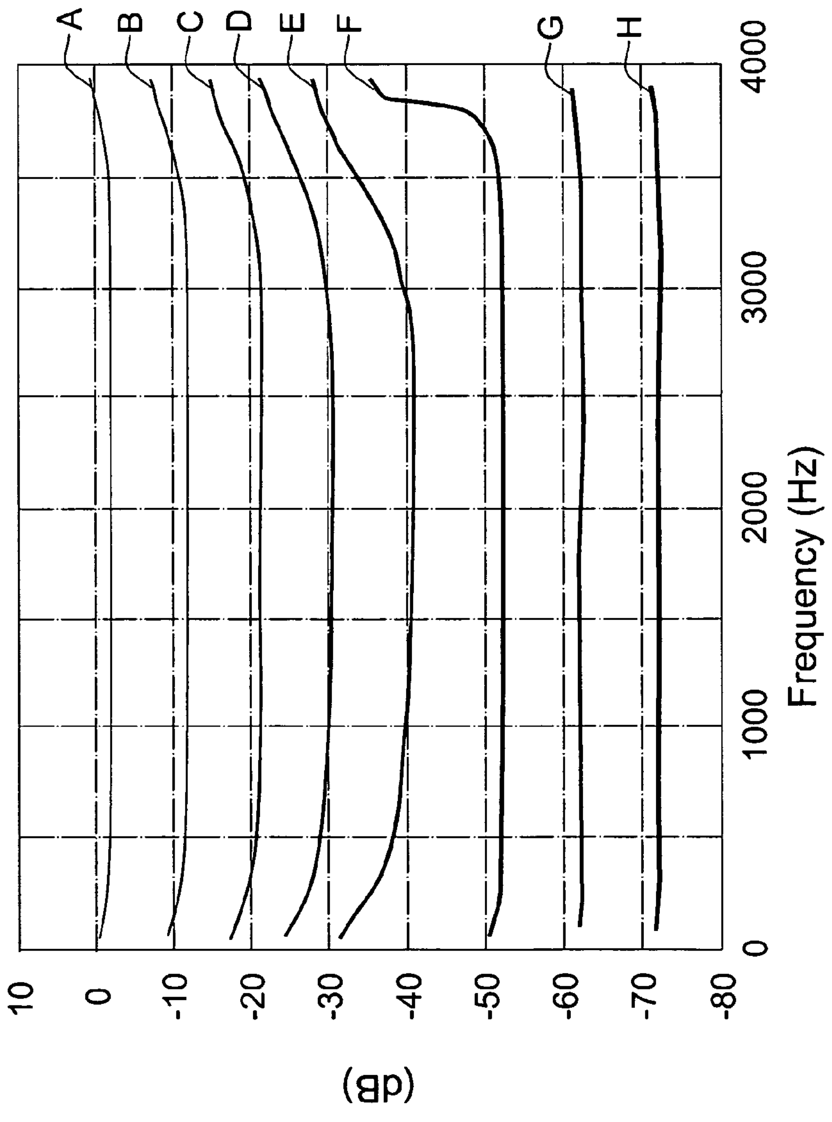
FIG. 4 is a graph of a typical frequency response in AGC mode for the dynamic loudness module of FIGS. 1-2 in its entirety (from In Signal to Out Signal) in which curves A-H describe modified loudness values as a function of frequency, for various input loudness levels ranging from 0 dB to −70 dB.
FIG. 5 is a table presenting a legend for the graph of FIG. 4, indicating the input loudness, in decibels, for each of the curves illustrated in FIG. 4 which represent intensity modifications as a function of frequency for a particular input loudness, in accordance with preferred embodiments of the present invention, it being appreciated that the particular values shown in FIGS. 4 and 5 are merely exemplary and are not intended to be limiting.
Figure 6:
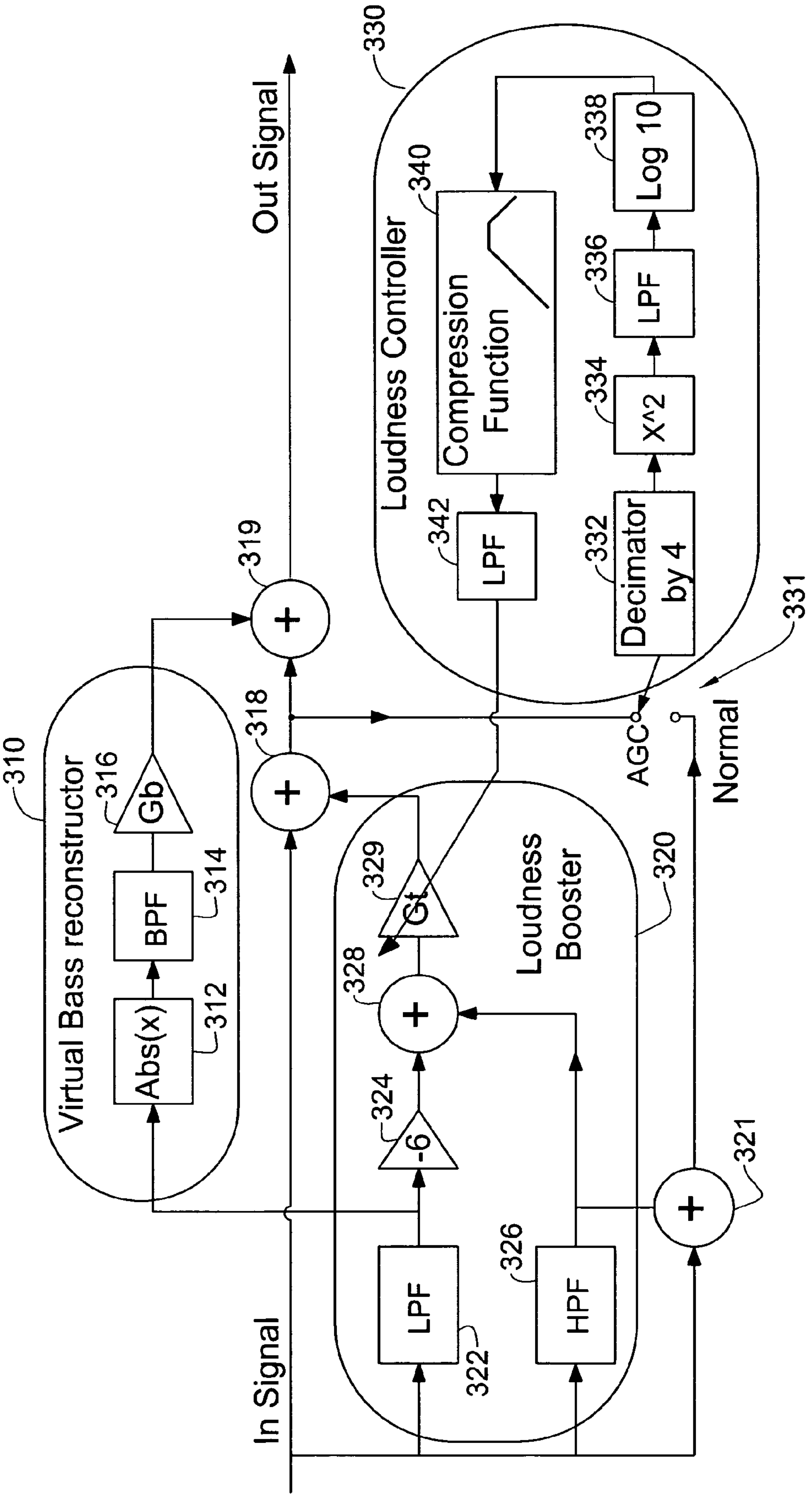
FIG. 6 is a simplified block diagram of the dynamic loudness module of FIGS. 1-2 constructed and operative in accordance with a preferred embodiment of the present invention.

A preferred embodiment of the dynamic loudness module 30 of FIGS. 1-2 is illustrated in FIGS. 3-6 of which FIG. 3 is a graph of a typical compression function for the dynamic loudness module 30, FIG. 4 is a graph of a typical frequency response (AGC mode) for the dynamic loudness module 30, dependent on the input decibel level as shown in FIG. 5, and FIG. 6 is a detailed block diagram of the dynamic loudness module 30.

As shown, the dynamic loudness module typically comprises a virtual bass reconstructor unit 310, a loudness booster 320 and a loudness controller 330. These interact as described below, in either of two selectable modes, the first termed herein the "normal" mode and the second termed herein the "automatic gain control (AGC) mode" or "recursive mode". The apparatus of FIG. 6 is in its recursive mode when normal/AGC switch 331 is in its first position, as shown, in which the input to loudness controller 330 is recursively provided by summer 318. The apparatus of FIG. 6 is in its normal mode when normal/AGC switch 331 is in its second position (not shown), in which the input to loudness controller 330 is simply the in-signal. Operation of the apparatus in these two modes is now described.

First, in normal mode, the input signal (In Signal) loudness is estimated by filtering, including summing (at reference numeral 321) the input signal with a HPF unit 326 output. The energy of this signal is computed using decimator-by-4 unit 332 (preferably provided in order to save MIPS), x^2 operation Unit 334, smoothing LPF unit 336 and Log operation unit 338. The result is an estimator for the input loudness in dB. In the recursive mode of operation, the input to the Loudness Controller unit 330 is recursive, typically comprising the output of the loudness booster 320 summed with the In Signal by summer 318. Therefore, the AGC is similar to known Automatic Gain Control (AGC) operations in which sensing is performed on gain control output.

Loudness control is typically effected by a lookup table 340 and another smoothing LPF 342. The loudness control gain factor 329 modifies the amount of low pass and high pass filtered signals added to the In Signal by adder 318. In the illustrated embodiment, both bands are modified with the same control signal (Gt). However, of course, this is not the only possible implementation. Examples of design parameters are as follows: LPF unit 322 cut-off frequency at 250 Hz; HPF unit 326 cut-off frequency at 3400 Hz; unit 324 comprises a −6 dB attenuator; for both LPF unit 336 and unit 342, cut-off frequency at 70 Hz; unit 314 comprises a band-pass filter for virtual bass frequencies e.g. for the frequency band from 180 Hz to 500 Hz; and unit 316 comprises a multiplier which multiplies the appropriate portion of Virtual Bass by a user-selected gain-of-bass setting (Gb).

Modification of the cut off frequency (f_c) parameter of filters 332 and/or 326 may be provided if the user employs a single parameter for each band. For example, for a simple pole LPF with cut off point of (f_c) (in Hz), the following approximation formula may be employed that need not use a sin(x) function:

$$A=1-2*pi*f\_c/8000;$$

The simple pole LPF's output y(n) may be related to its input x(n) according to:

$$y(n)=y(n-1)*A+(1-A)*x(n).$$

As described above, the dynamic loudness module 30 is operative to improve intelligibility e.g. by fixing or modifying the incoming signal to fit a human hearing threshold, and virtual bass is typically added to replace low frequency energy removed by the network and/or loudspeaker. High and low frequencies of weak signals may be dynamically boosted, because the human ear is not uniformly sensitive to all frequencies. For very weak signals, considered background noise, boosting of background noise level is not desirable. Therefore at such levels, high and low frequency bands are attenuated e.g. as shown in FIG. 3, so as to reduce background noise. Telephony conformance testing according to standards such as the TBR38 standard are still met because the frequency response at high levels, such as −10 dBV, is almost flat.

Another problem is that loudspeakers and, sometimes networks, tend to remove low frequencies. According to a preferred embodiment of the present invention, missing low frequency harmonics are replaced, thereby to provide a "virtual bass" which is capable of deceiving the human ear.

A preferred non-linear compression function for compression unit 340 is illustrated in FIG. 3 and may be effectively user-controlled even using a minimal number of parameters. For example, the maximum boosting level (MAXB) is typically 15 dB, the optimal input level (OPTIN) is typically −40 dB, and the suppress threshold (THS) is typically −50 dB as shown in FIG. 3. Below −50 dB, the loudness is attenuated (negative loudness modification values on the vertical axis) whereas above that threshold, loudness is typically increased (positive loudness modification values on the vertical axis).

The corner points (TL) and (TH) which define the suppression threshold, may be computed according to the following equations:

$$TH=OPTIN-OPTIN/8$$

$$TL=OPTIN+(THS-OPTIN)/4$$

The band of intensities at which the loudness of a band of poorly heard frequencies is boosted, is therefore preferably programmable. This is effected, in unit 340, by varying the values of (Optin) and/or (MaxB). The suppression threshold similarly may be programmed by varying the value assumed by (THS) or (TL). In summary, a particular advantage of a preferred embodiment of the present invention as described herein is that (a) the band of intensities at which the loudness of a band of poorly heard frequencies is boosted, and/or (b) the suppression threshold, or threshold intensity level below which loudness is attenuated, is easily programmable using even a very small number of parameters.

As shown in FIG. 6, input signal (In Signal) loudness is estimated at Normal mode first by passing the input signal via a filter constructed by summing the input with a HPF unit 326 output. The energy of this signal may be computed using x^2 operation Unit 334, Decimator-by-4 unit 332 (in order to save on MIPS), smoothing LPF unit 336 and Log operation unit 338. The result is an (en) estimator for the input loudness in dB. In another mode of operation provided in accordance with certain embodiments of the present invention, the input to the Loudness Controller unit 330 is taken recursively from the output of the loudness modifier. In this mode the behavior is similar to the operation of AGC, where sensing is performed from output of the variable gain control.

Loudness control is typically effected by a lookup table and another smoothing LPF 342. This loudness control, embodied by the (Gt) parameter as shown, modifies the amount of LPF and HPF portions added to the In Signal by unit 329. In the illustrated embodiment both bands are modified with the same control signal (Gt), however this need not be the case. Examples of suitable design parameters are as follows: unit 322's LPF cut-off frequency at 250 Hz; unit 326's HPF cut-off frequency at 3400 Hz, unit 326 comprises a −6 dB attenuator, unit 336's LPF has a cut-off frequency at 70 Hz, unit 314 comprises a band-pass filter for the frequency band from 180 Hz to 500 Hz, and (Gb) unit 316 comprises a multiplier which multiplies the required portion of Virtual Bass using a Gain setting selected by user.

Figure 7:
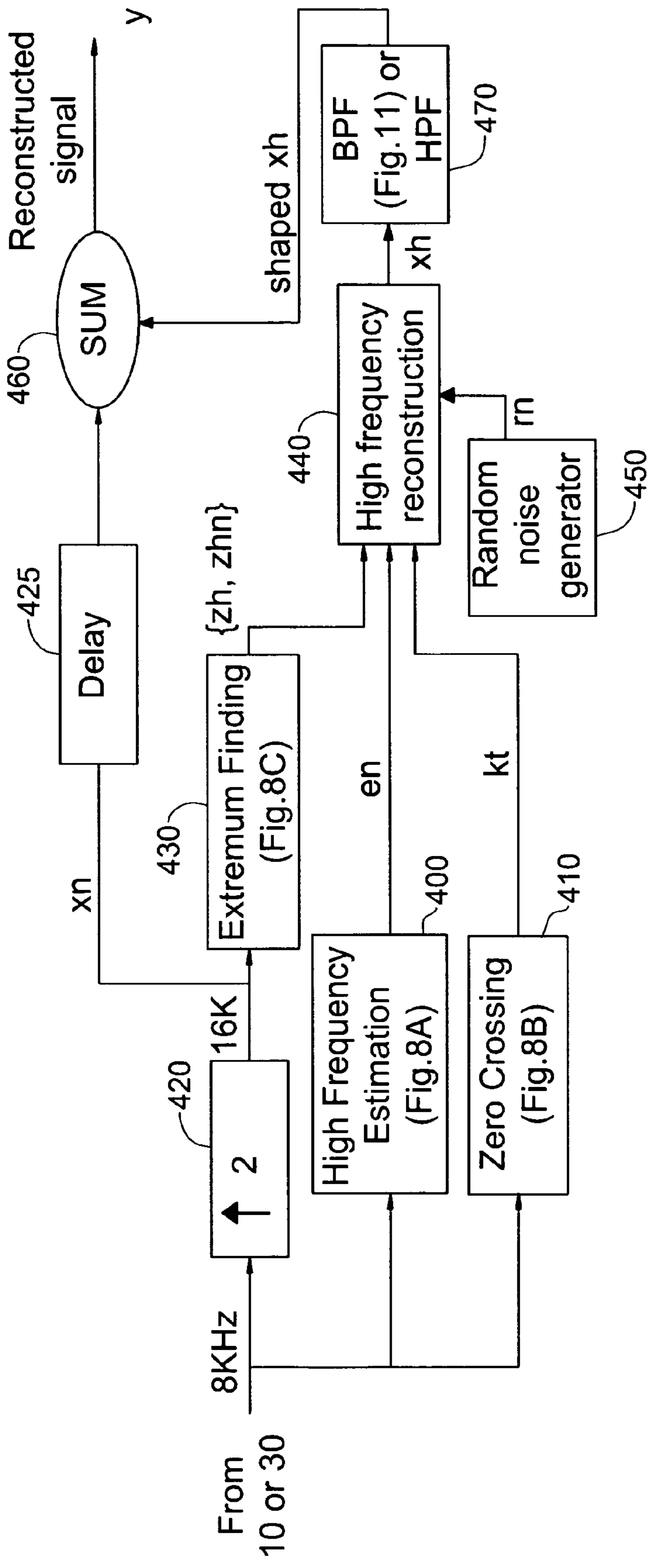
FIG. 7 is a simplified block diagram of the wide-band synthesis module of FIGS. 1-2 constructed and operative in accordance with a preferred embodiment of the present invention.
Figure 8A:
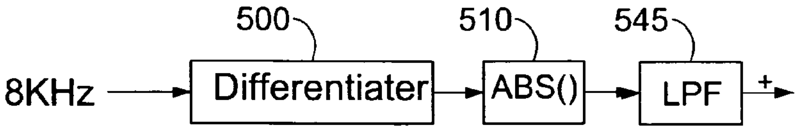
FIG. 8A is a block diagram of the high frequency estimation unit 400 of FIG. 7 constructed and operative in accordance with a preferred embodiment of the present invention.
Figure 8B:
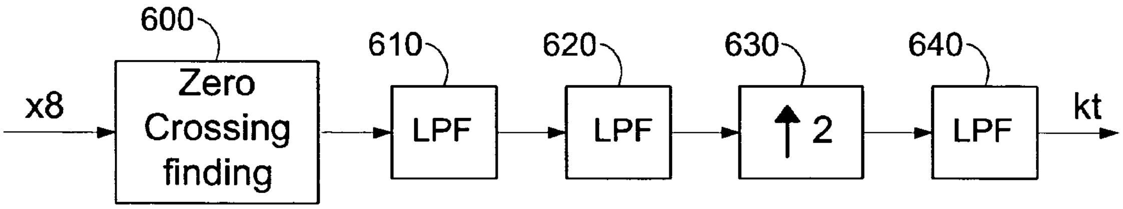
FIG. 8B is a simplified block diagram of the zero crossing unit 410 of FIG. 7 constructed and operative in accordance with a preferred embodiment of the present invention.
Figure 8C:
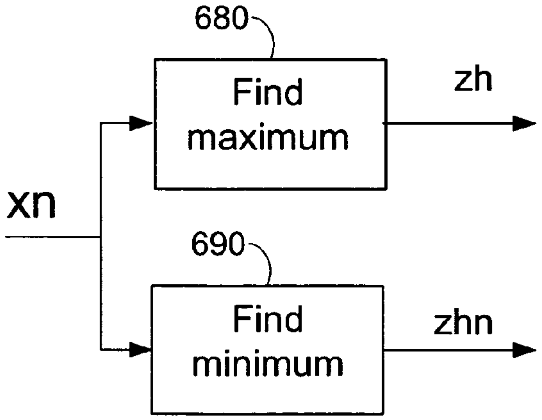
FIG. 8C is a simplified block diagram of the extremum finding unit 430 of FIG. 7 constructed and operative in accordance with a preferred embodiment of the present invention.
Figure 9:
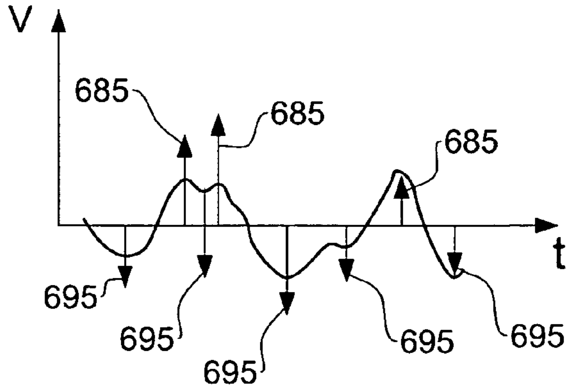
FIG. 9 is a pictorial illustration of signal extremum points.

A preferred module of the wide band synthesis module 40 of FIGS. 1-2 is now described generally with reference to FIGS. 7-9 of which FIG. 7 is a simplified block diagram of the wide-band synthesis module 40 constructed and operative in accordance with a preferred embodiment of the present invention, and FIGS. 8A-8C are simplified block diagrams of the high frequency estimation unit, zero crossing unit, and extremum finding unit of FIG. 7, respectively, each constructed and operative in accordance with preferred embodiments of the present invention. FIG. 9 is a pictorial illustration of extremum of the interpolated input telephone signal voltage as a function of time, in which upward arrows 685 denote local voltage maxima whereas downward arrows 695 indicate local voltage minima as shown.

As described above, the wide band synthesis module 40 is operative to expand the bandwidth from narrow to wide e.g. from 3.4 KHz to 6.5 KHz. A particular advantage of this module is that it enhances distinction between sibilants. Typically, the module converts narrow band signals received at a rate of 8K samples per second, to a wide band signal traveling at 16K samples per second.

As shown in FIG. 7, wide band synthesis module 40 reconstructs an estimation for a missing portion of the wideband signal. The reconstructed portion of the wideband signal typically comprises a high frequency energy estimate (en), a smoothed zero crossing measure (kt), and extremum points (i.e. positive and negative peaks of the signal), comprising pulses (zh) and (zhn). These are provided by units 400, 410 and 430 respectively as shown. Typically, as shown in FIG. 9, which illustrates the interpolated signal voltage as a function of time, in each positive peak location, a positive pulse is generated and in each negative peak, a negative pulse is generated. A preferred method for finding extremum locations (zh) in the interpolated signal (xn) can be described using Matlab terminology, as follows:

xd=diff(xn) % first time derivative of the interpolated signal.

zh=diff(xd)>0; % second derivative producing positive pulse at the positive peaks.

zhn=−(diff(xd<0)>0); % second derivative producing negative pulse at the negative peaks.

The wide band addition to the signal (xh) is now reconstructed by high frequency reconstruction unit 440 and unit 470, typically using the following schema:

$$xh=(zh+zhn+m)*\mathrm{en}*\mathrm{kt}$$

where (en) and (kt) are described above, and (m) is a random noise component supplied by a random noise generator 450.

Figure 12:
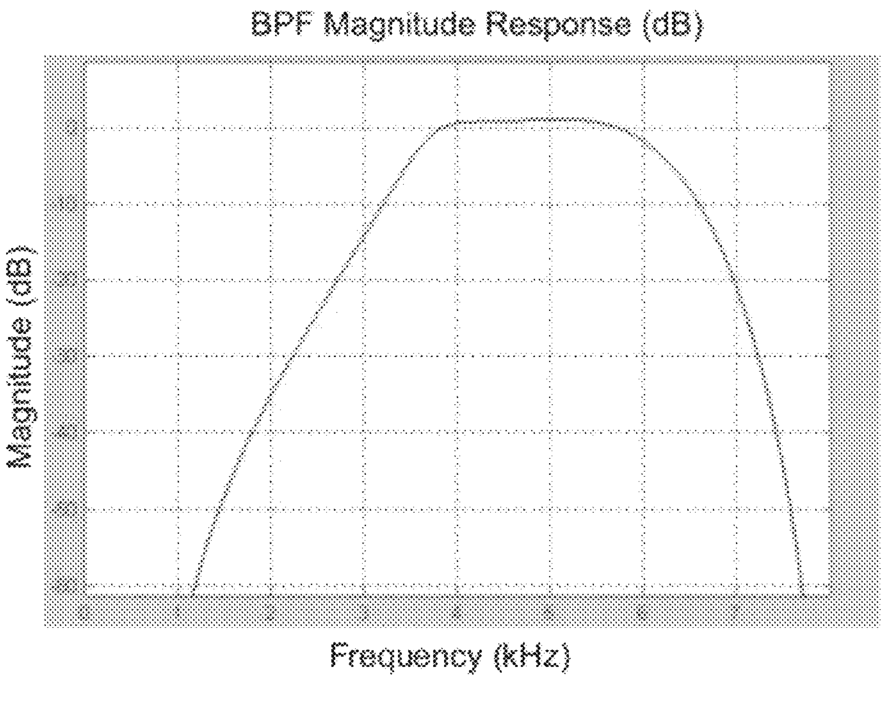
FIG. 12 is a graph of an example of a suitable frequency response for band pass filter 470 of FIG. 7.

Next, the reconstructed signal (xh) passes a shaping filter unit 470 which may comprise a bandpass filter comprising a high pass filter e.g. at 3600 Hz and a low pass filter e.g. at 6000 Hz. A suitable frequency response is shown in FIG. 12. The output of filter 470 is therefore a synthesized signal shaped from the original (xh) signal. Finally, the interpolated narrow band signal is combined after a delay of e.g. 10 samples, provided by delay unit 425, with the shaped synthesized signal (xh) which has exited band pass filter 470.

Figure 10:
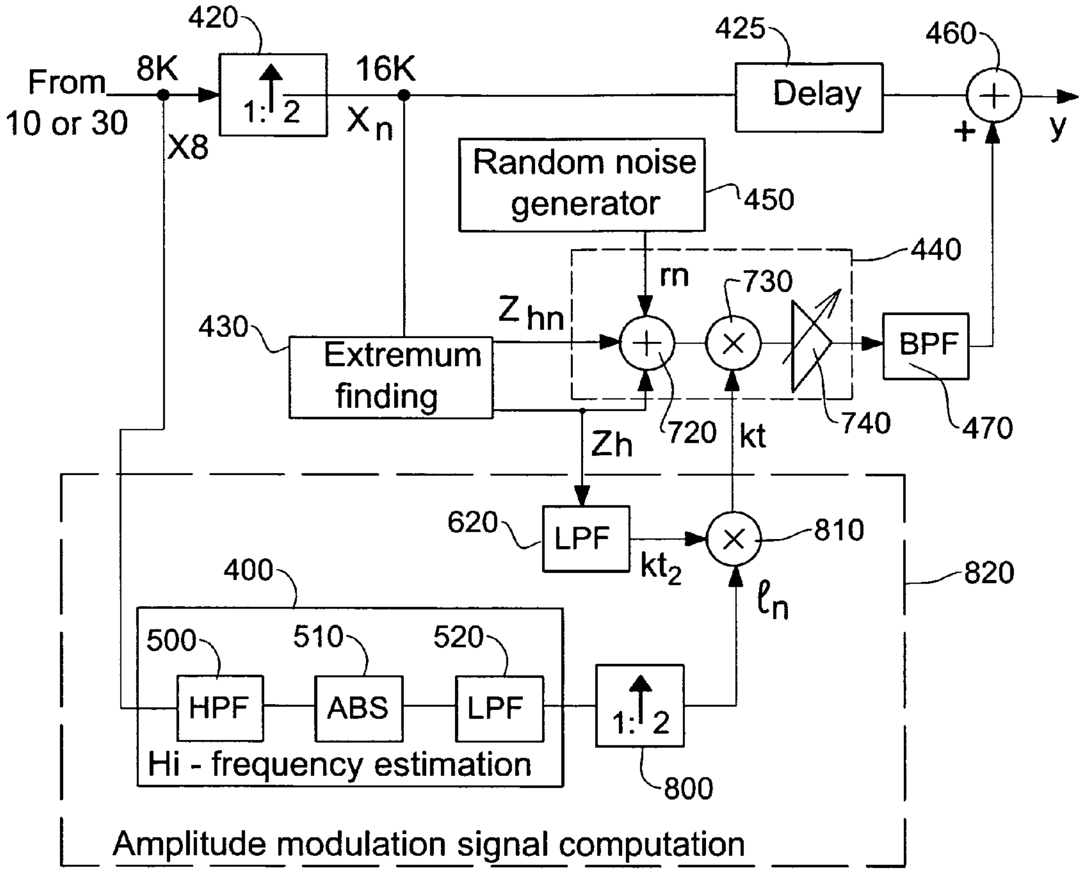
FIG. 10 is a detailed block diagram of one preferred implementation of the wide-band synthesis module of FIGS. 1-2 constructed and operative in accordance with certain embodiments of the present invention.

FIG. 10 is a detailed block diagram of one preferred implementation of the WBS unit 40 of FIGS. 1-2. Units of FIG. 10 which may be similar or identical to corresponding units in FIG. 7 are identically numbered. It is appreciated that the particular details of implementation are merely exemplary and are not intended to be limiting. Unit 420 is a conventional up-sample interpolator that produces two samples for each input sample. It may be implemented for example by zero insertion and passage through a low pass interpolation filter. Unit 430, which may be as shown in FIG. 8C, produces harmonic extrapolated pulses. Unit 440 is a high-frequency reconstruction unit. In it, typically, a summer unit 720 combines the positive pulses (zh), negative pulses (zhn) and, optionally, a small amount of random noise e.g. having a level of 2^-5 relative to the pulses. Its amplitude is modulated by a control signal (kt) which is multiplied in by multiplier unit 730. The final amount of reconstructed signal added to the narrow band signal may be set by a programmable control and multiplied in unit 740. Finally, a synthetic high band signal is produced by shaping filter unit 470 which may comprise a band-pass filter e.g. with a frequency response as illustrated in FIG. 12. A summer unit 460 combines the delayed output of unit 420 with the synthetic high band signal exiting shaping filter 470.

The control signal (kt) may be generated as follows: High frequency estimation unit 400 estimates the energy of the signal's high frequency portion. In unit 400, HPF unit 500 and unit 510 may be implemented as follows, using Matlab notation:

```
BN=conv([1 -1],[1 -1])/4);
en=abs(filter(BN,1,x8));
```

LPF unit 520 may be implemented as follows, again using Matlab notation:

```
[Bd,Ad]=butter(1,100/8000*2);
en=filter(Bd,Ad,en);
```

Instead of using Zero Crossing unit 600, extremum pulse signal (zh), computed as described above, may be used, after being filtered by low pass filter unit 620.

LPF unit 620, may be implemented as follows, using Matlab notation:

```
nZ=32;
kt2=filter(1/nZ, [1 (1/nZ-1)], zh);
kt2=filter(1/16,[1 (1/16 -1)], kt2);
```

Figure 11:
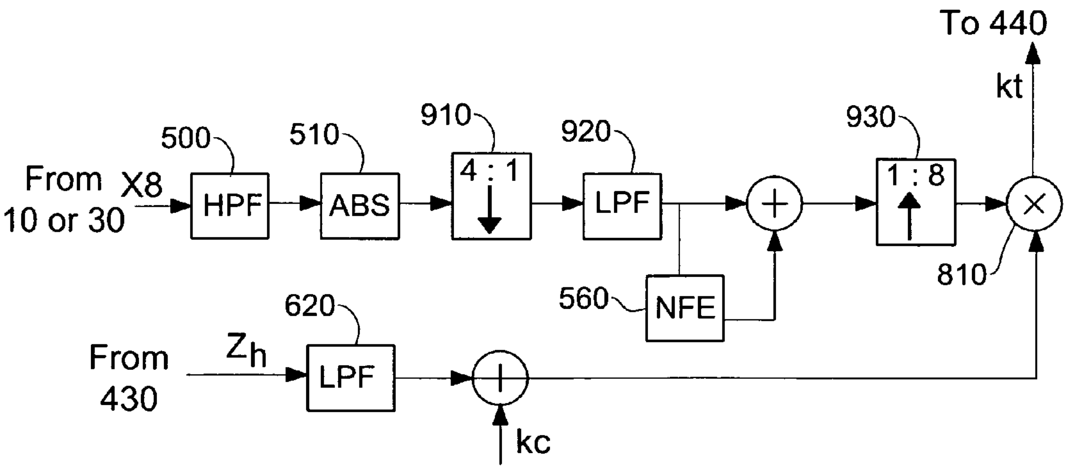
FIG. 11 is an alternative implementation of the amplitude modulation signal computation unit of FIG. 10 constructed and operative in accordance with certain embodiments of the present invention.

FIG. 11 illustrates an alternative embodiment for control block 820 of FIG. 12 which computes the amplitude modulation signal (kt) of the pulse train (zh, zhn). In this embodiment, the LPF unit 520 may be implemented more efficiently by using conventional decimation filter technique; for example a decimating filter unit 910 may be provided which is operative to decimate by 4, thereby to reduce MIPS. The embodiment of FIG. 11 preferably comprises one or both of the following features: (a) Noise floor estimation; and (b) Constant minimal enhancement for non-sibilants such as vowels e.g. using a programmable (kc) constant as described in detail below. Preferred implementations of these features are now described.

(a) Noise floor estimation unit 560 is a noise level estimator that may be reduced from the high passed energy estimation. The signal (en) is preferably repeated 8 times to restore it to the 16 kHz sampling rate. A noise floor estimation signal em(n) may be computed in unit 560 e.g. according to the following formula:

$$em(n)=em(n-1)-(en(n)-em(n-1)))/2\hat{}12+(em(n-1)>en(n))*(en(n)-em(n-1))/2\hat{}4;$$

(b) Constant Enhancement: The programmable parameter (kc) may by used to effect enhancement for values which do not have high energy at the high frequency band. To brighten sound of vowels as well, this parameter may be assigned a value greater than 0.

A preferred embodiment of the wide band synthesis module e.g. that shown and described in FIGS. 7-12, may enjoy several advantages over the prior art. In conventional wideband synthesis modules, a decision is made on whether or not a sound is a sibilant, using a folding technique or LPC analysis or an FFT. Folding, however, produces a spectral mirror which sounds metallic for vowels, and both LPC and FFT add delay. On the other hand, wrong decisions regarding sibilants produce wrong sounds. It is appreciated therefore that the wideband synthesis module of FIGS. 7-12 may provide one, some or all of the following advantages over conventional systems:

a. Transitions between sibilants and vowels are smooth. Sibilants are not detected; instead, brightness is enhanced for vowels as well, using harmonic extrapolation.
b. Harmonic reconstruction is based on pulse trains at the extremum points of the interpolated input.
c. There is much less delay since the process shown and described herein comprises a sample-by-sample process.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A method for improving the intelligibility of an incoming telephone signal, the method comprising:

boosting loudness of at least one band of poorly heard frequencies of the incoming telephone signal within at least one band of intensities of the incoming telephone signal, said band lying below a predetermined intensity level at which telephone standard conformance testing is performed, thereby to generate a dynamically boosted telephone signal;

using a low pass filter for receiving and filtering said incoming telephone signal thereby to provide a low passed signal; and computing an envelope estimate by band-pass filtering an absolute value of the low passed signal and passing said band-passed filtered absolute value into a summation operator for summation with said boosted signal.

2. Apparatus for enhancing the intelligibility of sibilants in a narrow band telephone signal, the apparatus comprising:

a sample rate doubler doubling the sampling rate of the narrow band telephone signal by interpolation, thereby to provide an interpolated signal;

a harmonic extrapolator producing a harmonic extrapolation of missing portions of the telephone signal, the harmonic extrapolation comprising a sequence of pulses located at peaks of the interpolated signal;

a missing energy estimator generating a missing energy estimator measure estimating energy missing at high frequency bands of the telephone signal;

a continuous amplitude modulator continuously modulating the amplitude of the pulses in said sequence of pulses based on said missing energy estimator measure, thereby to generate a modulated signal;

a shaping filter which converts the modulated signal into a shaped signal; and a summer summing the shaped signal with the interpolated signal, wherein said missing energy estimator generating a missing energy estimator measure comprises:

apparatus for passing the narrow band telephone signal through a zero-crossing identification unit and subsequently through a low pass filter thereby to generate an LPF output; and apparatus for multiplying the LPF output by an estimate of the energy of the high frequency portion of the narrow band telephone signal thereby to obtain said energy estimator measure, and wherein said continuous amplitude modulator comprises apparatus for multiplying an amplitude function of said sequence of pulses by said energy estimator measure.

3. A method for enhancing the intelligibility of sibilants in a narrow band telephone signal, the method comprising:

doubling the sampling rate of the narrow band telephone signal by interpolation, thereby to provide a narrow band interpolated signal;

generating a harmonic extrapolation signal by harmonically extrapolating from the narrow band interpolated signal thereby to estimate the missing portions of the telephone signal, the harmonic extrapolation comprising a sequence of pulses located at peaks of the interpolated signal;

generating a missing energy estimator measure estimating energy missing at high frequency bands of the telephone signal;

continuously modulating the amplitude of the pulses in said sequence of pulses based on said missing energy estimator measure, thereby to generate a modulated signal;

passing the modulated signal through a shaping filter thereby to obtain a shaped signal; and summing the shaped signal with the interpolated signal, wherein said step of generating a missing energy estimator measure comprises:

passing the narrow band telephone signal through a zero-crossing identification unit and subsequently through a low pass filter thereby to generate an LPF output; and multiplying the LPF output by an estimate of the energy of the high frequency portion of the narrow band telephone signal thereby to obtain said energy estimator measure;

and wherein said step of continuously modulating comprises multiplying an amplitude function of said sequence of pulses by said energy estimator measure.

4. A system for improving the intelligibility of an incoming telephone signal, the system comprising:

apparatus for boosting loudness of at least one band of poorly heard frequencies of the incoming telephone signal within at least one band of intensities of the incoming telephone signal, said band lying below a predetermined intensity level at which telephone standard conformance testing is performed, thereby to generate a dynamically boosted telephone signal;

a low pass filter operative for receiving and filtering said incoming telephone signal thereby to provide a low passed signal; and a virtual bass reconstructor operative for computing an envelope estimate by band-pass filtering an absolute value of the low passed signal and passing said band-passed filtered absolute value into a summation operator for summation with said boosted signal.

5. A method according to claim 1 wherein loudness of at least one band of poorly heard frequencies of the incoming telephone signal is boosted at said predetermined intensity level only to the extent allowed by the telephone standard.

6. A system according to claim 4 which is also operative to boost loudness of at least one band of poorly heard frequencies of the incoming telephone signal at said predetermined intensity level wherein the loudness is boosted at the predetermined intensity level only to the extent allowed by the telephone standard.

7. Apparatus according to claim 1 and wherein the loudness is boosted within said intensity band to an extent which exceeds the extent allowed by the telephone standard at said predetermined intensity level.

8. Apparatus according to claim 4 which resides interiorly of a telephone receiver.

9. A method according to claim 1 wherein the band of poorly heard frequencies in which loudness is boosted within said at least one band of intensities is programmable.

10. A method according to claim 1 wherein the band of intensities at which the loudness of a band of poorly heard frequencies is boosted, is programmable.

11. A method according to claim 5 and wherein said boosting loudness is operative to attenuate loudness of at least one band of frequencies of the incoming telephone signal within at least one band of intensities of the incoming telephone signal lying below a threshold intensity level below which the signal is considered background noise.

12. A method according to claim 5 wherein operation of the boosting is determined at least partly as a function of a loudness estimate determined by filtering the incoming telephone signal, measuring the energy of the filtered signal, and smoothing the measured energy over time.

13. A method according to claim 5 wherein the extent of boosting is a non-linear function of the intensity level of the incoming telephone signal.

14. A method according to claim 13 and also comprising a compression table storing desired levels of boosting as a function of intensity level of the incoming telephone signal.

15. A method according to claim 5 wherein operation of the boosting is determined at least partly as a function of a loudness estimate determined recursively by measuring the energy of the telephone signal after its loudness has been modified by the loudness modifier.

16. A method according to claim 12 wherein at least one of the extent of loudness modification and the direction of loudness modification effected by the boosting at at least one intensity level is determined as a function of said loudness estimate.

17. A method according to claim 1 and also comprising multiplying said envelope estimate by a programmed factor.

18. A method according to claim 3 wherein the estimate of the energy of the high frequency portion is generated by:

passing the narrow band telephone signal through a high pass filter comprising a differentiator, thereby to generate a high pass filtered narrow band telephone signal; and subtracting from the high pass filtered narrow band telephone signal an estimate of the noise level thereof.

19. A method according to claim 3 wherein said shaping filter comprises a bandpass filter.

20. A method according to claim 3 wherein said peaks comprise positive peaks.

21. A method according to claim 3 wherein said peaks comprise negative peaks.

22. A method according to claim 3 wherein said peaks comprise all positive peaks and all negative peaks.

23. A method according to claim 3 wherein said shaping filter comprises a high pass filter.

24. A method according to claim 3 wherein random noise is added to the harmonic extrapolation signal.

25. A method according to claim 3 wherein said step of generating a missing energy estimator measure comprises:

passing a pulse train signal located at peaks of the interpolated signal via a low pass filter; and multiplying the filtered pulse train signal by an estimate of the energy of a high frequency portion of the narrow band telephone signal thereby to obtain said energy estimator measure.

26. A method according to claim 1 and also comprising:

doubling the sampling rate of the dynamically boosted telephone signal by interpolation, thereby to provide an interpolated signal;

producing a harmonic extrapolation of missing portions of the dynamically boosted telephone signal, the harmonic extrapolation comprising a sequence of pulses located at peaks of the interpolated signal;

generating a missing energy estimator measure estimating energy missing at high frequency bands of the dynamically boosted telephone signal;

continuously modulating the amplitude of the pulses in said sequence of pulses based on said missing energy estimator measure, thereby to generate a modulated signal;

passing the modulated signal through a shaping filter thereby to obtain a shaped signal; and summing the shaped signal with the interpolated signal.

* * * * *